United States Patent [19]

Aaker et al.

[11] Patent Number: 5,758,087
[45] Date of Patent: May 26, 1998

[54] APPARATUS AND METHOD FOR PREDICTED RESPONSE GENERATION

[75] Inventors: Kenneth Dale Aaker; Gary Scott Delp; Brad Louis Brech, all of Rochester, Minn.

[73] Assignee: International Business Machines Corporation, Armonk, N.Y.

[21] Appl. No.: 664,131

[22] Filed: Jun. 14, 1996

[51] Int. Cl.$^6$ .............................. G06F 13/00; G06F 9/06
[52] U.S. Cl. ............................ 395/200.62; 395/200.33; 370/389
[58] Field of Search ...................... 395/200.73, 346, 395/12, 329, 825, 200.33, 200.62, 840, 841, 427, 439, 200.56, 500, 200.61; 364/DIG. 1, DIG. 2; 370/349, 389

[56] References Cited

U.S. PATENT DOCUMENTS

| | | | |
|---|---|---|---|
| 4,931,935 | 6/1990 | Ohira et al. | 364/419 |
| 4,984,264 | 1/1991 | Katsube | 379/197 |
| 5,278,963 | 1/1994 | Hattersley et al. | 395/400 |
| 5,331,613 | 7/1994 | Yamada | 369/32 |
| 5,341,477 | 8/1994 | Pitkin et al. | 395/200 |
| 5,367,643 | 11/1994 | Chang et al. | 395/325 |
| 5,389,773 | 2/1995 | Coutts et al. | 235/379 |
| 5,406,643 | 4/1995 | Burke et al. | 395/200.73 |
| 5,430,840 | 7/1995 | Berg et al. | 395/346 |
| 5,613,155 | 3/1997 | Baldiga et al. | 395/825 |

OTHER PUBLICATIONS

J. Postel, "DOD Standard Internet Protocol", Jan. 1, 1980;RFC 760.
J. Postel, "DOD Standard Transmission Control Protocol", Jan. 1, 1980; RFC 761.
J. Postel, "Internet Protcol", Sep. 1, 1981; RFC 791.
J. Postel, "Transmission Control Protocol", Sep. 1, 1981; RFC 793.
Sun Microsystems, Inc., "RPC: Remote Procedure Call Protocol Specification Version 2", Jun. 1, 1988; RFC 1057, pp. 1–25.
Sun Microsystems, Inc., "NFS: Network File System Protocol Specification", Mar. 1, 1989; RFC 1094, pp. 1–27.

*Primary Examiner*—Daniel H. Pan
*Attorney, Agent, or Firm*—Joan Pennington; Owen J. Gamon

[57] ABSTRACT

A method and apparatus are provided for generation of predicted responses in a computer communications network system. A server in the computer communications network system predicts the client's next request based on the present client's request. The server sets a trigger that recognizes a match of the client's predicted request. When a client's predicted request arrives, the trigger sends the response. Additionally, the server associates a timeout action with the predicted response so that if a predicted request is not received within the timeout interval or other events occur before the predicted request arrives, the triggered response is removed and an alternative action is performed.

16 Claims, 12 Drawing Sheets

REQUEST PACKET 400 BY CLIENT 100

| # | | | | |
|---|---|---|---|---|
| 1 | LAN EMULATION HEADER | | MAC DESTINATION ADDRESS=A | MAC |
| 2 | MAC DESTINATION ADDRESS (CONT) | | | MAC |
| 3 | MAC SOURCE ADDRESS=B | | | MAC |
| 4 | MAC SOURCE ADDRESS (CONT) | | MAC PACKET LENGTH | MAC |
| 5 | VERSION | IP HLEN | TYPE OF SERVICE | IP TOTAL LENGTH = 108 | IP |
| 6 | PACKET IDENTIFICATION=X* | | FLAGS | FRAGMENT OFFSET | IP |
| 7 | TIME TO LIVE | PROTOCOL | HEADER CHECKSUM* | IP |
| 8 | IP SOURCE ADDRESS=C | | | IP |
| 9 | IP DESTINATION ADDRESS=D | | | IP |
| 10 | SOURCE PORT=E | | DESTINATION PORT=F | UDP |
| 11 | LENGTH | | CHECKSUM* | UDP |
| 12 | MESSAGE ID=G* | | | RPC |
| 13 | MESSAGE TYPE (0 FOR CALL) | | | RPC |
| 14 | RPC VERSION NUMBER (2) | | | RPC |
| 15 | REMOTE PROGRAM (0X186A3 FOR NETWORK FILE SYSTEM) | | | RPC |
| 16 | REMOTE PROGRAM VERSION (2) | | | RPC |
| 17 | REMOTE PROCEDURE (6 FOR READ) | | | RPC |
| 18 | AUTHENTICATION TYPE (0 AUTH_NONE) | | | RPC |
| 19 | AUTHENTICATION POINTER=0 | | | RPC |
| 20 | AUTHENTICATION LENGTH=0 | | | RPC |
| 21 | FILE HANDLE BYTES 0-3 =H | | | NFS |
| 22 | FILE HANDLE BYTES 4-7 | | | NFS |
| 23 | FILE HANDLE BYTES 8-11 | | | NFS |
| 24 | FILE HANDLE BYTES 12-15 | | | NFS |
| 25 | FILE HANDLE BYTES 16-19 | | | NFS |
| 26 | FILE HANDLE BYTES 20-23 | | | NFS |
| 27 | FILE HANDLE BYTES 24-27 | | | NFS |
| 28 | FILE HANDLE BYTES 28-31 | | | NFS |
| 29 | OFFSET IN FILE = J | | | NFS |
| 30 | COUNT OF BYTES TO READ = K | | | NFS |
| | TOTAL COUNT (NOT USED) | | | NFS |

FIG.4

RESPONSE PACKET 500 BY SERVER 200

| # | Field | | | Layer |
|---|---|---|---|---|
| 1 | LAN EMULATION HEADER | | MAC DESTINATION ADDRESS=A | MAC |
| 2 | MAC DESTINATION ADDRESS (CONT) | | | MAC |
| 3 | MAC SOURCE ADDRESS=B | | | MAC |
| 4 | MAC SOURCE ADDRESS (CONT) | | MAC PACKET LENGTH | MAC |
| 5 | VERSION / IP HLEN / TYPE OF SERVICE | | IP TOTAL LENGTH = 100 | IP |
| 6 | PACKET IDENTIFICATION | | FLAGS / FRAGMENT OFFSET | IP |
| 7 | TIME TO LIVE / PROTOCOL | | HEADER CHECKSUM* | IP |
| 8 | IP SOURCE ADDRESS=D | | | IP |
| 9 | IP DESTINATION ADDRESS=C | | | IP |
| 10 | SOURCE PORT=F | | DESTINATION PORT=E | UDP |
| 11 | LENGTH | | CHECKSUM | UDP |
| 12 | MESSAGE ID *=G | | | RPC |
| 13 | MESSAGE TYPE (1 FOR RETURN) | | | RPC |
| 14 | REPLY STATUS (0 FOR ACCEPTED) | | | RPC |
| 15 | AUTHENTICATION TYPE (0 AUTH_NONE) | | | RPC |
| 16 | AUTHENTICATION POINTER=0 | | | RPC |
| 17 | AUTHENTICATION LENGTH=0 | | | RPC |
| 18 | NFS STATUS (0 = NO ERROR) | | | RPC |
| 19 | FILE STATUS | | | RPC |
| 20 | FILE TYPE (1 FOR NFREG-REGULAR FILE) | | | RPC |
| 21 | PROTECTION MODE BITS | | | NFS |
| 22 | # OF HARD LINKS | | | NFS |
| 23 | OWNER USER ID | | | NFS |
| 24 | OWNER GROUP ID | | | NFS |
| 25 | FILE SIZE IN BYTES | | | NFS |
| 26 | PREFERRED BLOCK SIZE | | | NFS |
| 27 | SPECIAL DEVICE | | | NFS |
| 28 | KILOBYTES OF DISK USED BY FILES | | | NFS |
| 29 | DEVICE NUMBER | | | NFS |
| 30 | INODE OF FILE | | | NFS |
| 31 | TIME OF LAST ACCESS | | | NFS |
| 32 | | | | |
| 33 | TIME OF LAST MODIFICATION OF FILE | | | NFS |
| 34 | | | | |
| 35 | TIME OF LAST CHANGE OF FILE | | | NFS |
| 36 | COUNT OF BYTES RETURNED = N | | | NFS |
| 37 | K BYTES OF DATA | | | DATA |
| 38 | o o o | | | |

FIG.5

TRIGGER SET DATA BLOCK 240

MATCH DATA 246

BYTE SEQUENCE 248

BIT SEQUENCE 250

HASH FUNCTION RESULT 252

RESPONSE TO BE TRANSMITTED FOR MATCH 254

ACTION TO TAKE WHEN MATCH OCCURS 256

APPARATUS AND METHOD FOR PREDICTED RESPONSE GENERATION

FIELD OF THE INVENTION

The present invention relates to the data processing field, and more particularly, relates to method and apparatus for generation of predicted responses in a computer communications network system.

DESCRIPTION OF THE PRIOR ART

Many protocol data flows across a network or between processors in a multiprocessor system use a request/response interaction technique. In known computer communications networks including a client system and a server system, each request received by the server system from the client system is processed in sequence. Each received request is processed by the server system as if each request is unique. As a result, the required server processor resources for handling interrupts, interrogating the request packet and identifying the server function for the request packet are high. It is desirable to provide an improved method and apparatus for efficiently processing server responses in a computer communications network requiring less server processor resources and minimizing required response time per request.

SUMMARY OF THE INVENTION

Important objects of the present invention are to provide an improved method and apparatus for effectively processing server responses in a computer communications network; to provide such method and apparatus that require server processor resources selected for short term average load rather than short term peak load and that minimize required response time per request; to provide such method and apparatus for generation of predicted responses in a computer communications network; and to provide such method and apparatus that overcome disadvantages of prior art arrangements.

In accordance with the above and other objects of the invention, a method and apparatus are provided for generation of predicted responses in a computer communications network system. In accordance with the invention, a next request can be predicted from the current request. The server in the network predicts the client's next request based on the present client's request. The server sets a trigger that will recognize a match of the client's predicted request. When a client's predicted request arrives, the trigger sends the response. Additionally, the server associates a timeout action with the predicted response so that if a predicted request is not received within the timeout interval or other events occur before the predicted request arrives, the triggered response is removed and an alternative action is performed.

Also, a success action can be associated with the triggered response; this action will be taken when the predicted request arrives. The success action can include a string of predicted responses. A prediction count can be maintained of the number of times the prediction has been successful. Tasks with a high prediction count can be prioritized above other tasks that have been less successfully predicted.

BRIEF DESCRIPTION OF THE DRAWINGS

The present invention together with the above and other objects and advantages may best be understood from the following detailed description of the preferred embodiments of the invention illustrated in the drawings, wherein:

FIG. 4 shows an exemplary request packet;

FIG. 5 shows an exemplary response packet;

DETAILED DESCRIPTION OF THE PREFERRED EMBODIMENTS

Figure 1:
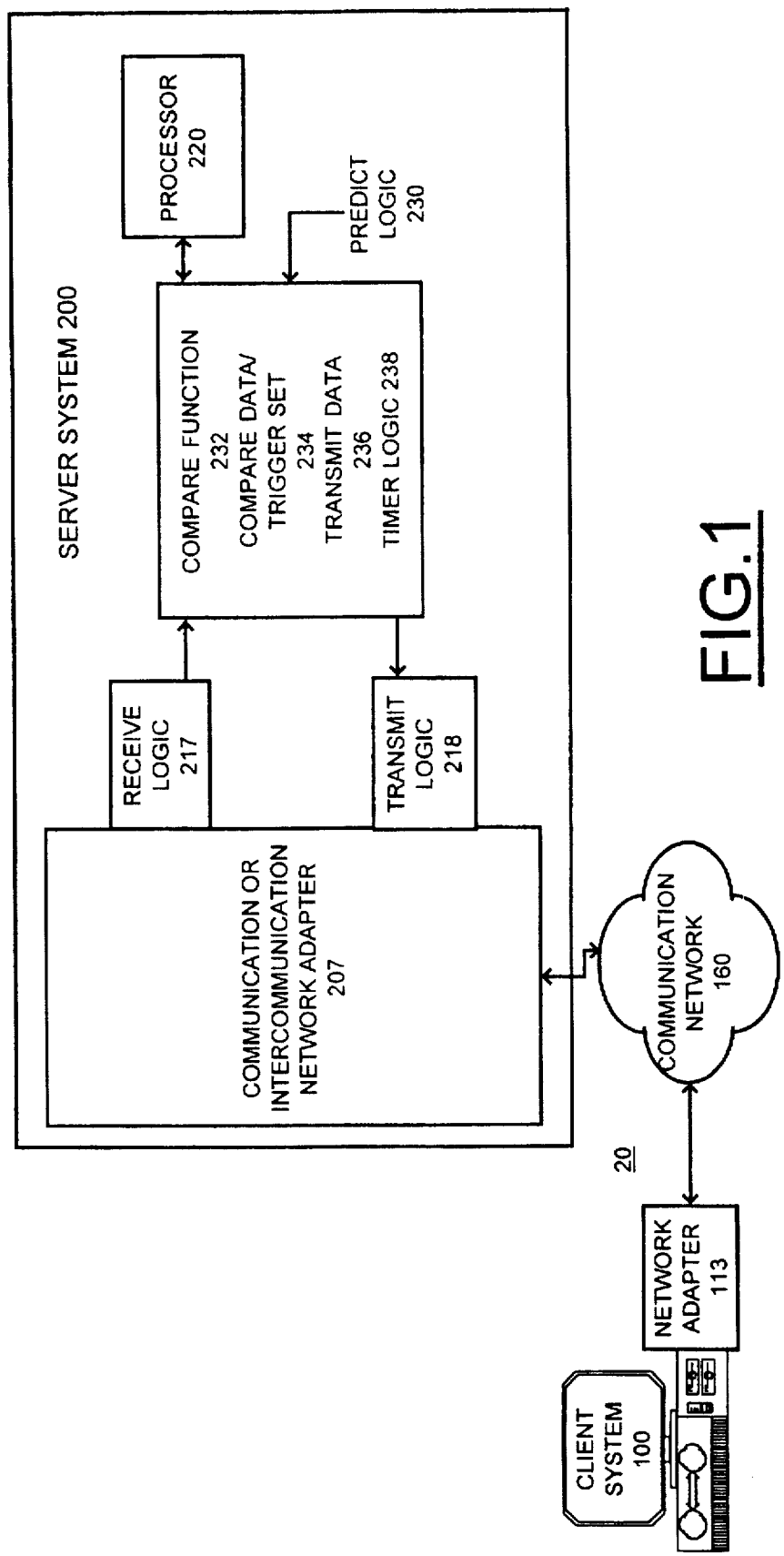
FIG. 1 is a block diagram representation of a preferred computer communications network system of the preferred embodiment.

Having reference now to the drawings, FIG. 1 shows a block diagram of an example of a computer communications network system generally designated by the reference character 20 which may be employed to implement the method of the preferred embodiment. A client computer system 100 with an associated network adapter or media adapter 113 is connected by communications network 160 to a server system 200. The server system 200 of the invention includes an associated network adapter 207, a receive logic module 217, a transmit logic module 218, a processor 220, and a predict logic module 230. Predict logic module 230 includes a compare function 232, a compare data and trigger set function 234, a transmit data function 236, and a timer logic function 238 for implementing a timeout action associated with a triggered response. Processor 220 can be implemented with multiple processors.

It should be understood that the computer communications network system 20 includes a multiple processor system with the communication network 160 defined by an intercommunication network between the multiple processors using a client/server request and response interaction technique. In the computer communications network system 20, the client system 100 and server system 200 can be implemented with various different commercially available computers, such as an IBM PS/2 including a storage file system. Also other types of computer system, whether it be another microcomputer such as an Apple Macintosh, a minicomputer such as an IBM System/390, or a microcomputer connected to a larger computer system such as an IBM AS/400 can be used for either or both of the client computer 100 and server system 200 and fall within the spirit and scope of this invention.

In accordance with an important feature of the server system 200 of the invention, a next request often can be predicted based upon the current request. A predicted response is generated by the server system 200 using the predict logic module 230. The server 200 sets a trigger that will recognize a match of the client's predicted request using the compare data and trigger set function 234. When client's predicted request arrives, the trigger sends the response using the transmit data function 236. Predict logic module 230 can be implemented by custom control logic or by processor executable instructions. Processor 220 is suitably programmed to carry out this invention, as described in more detail in the flowcharts of FIGS. 6A, 7, 8A, and 8C. The trigger is a data block illustrated and described with respect to FIG. 6B.

Figure 2A:
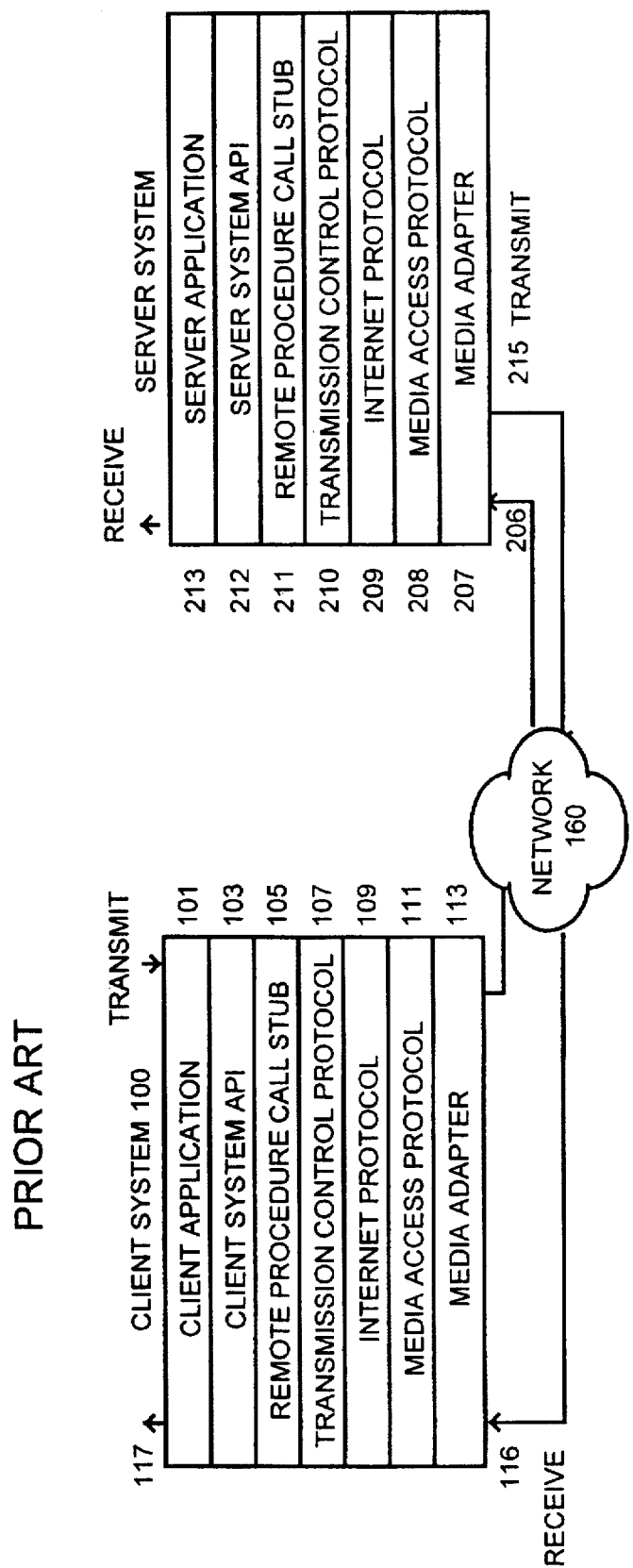
FIG. 2A is a block diagram representation of a prior art protocol stack of a client and server system in a conventional computer communications network system.
Figure 2B:
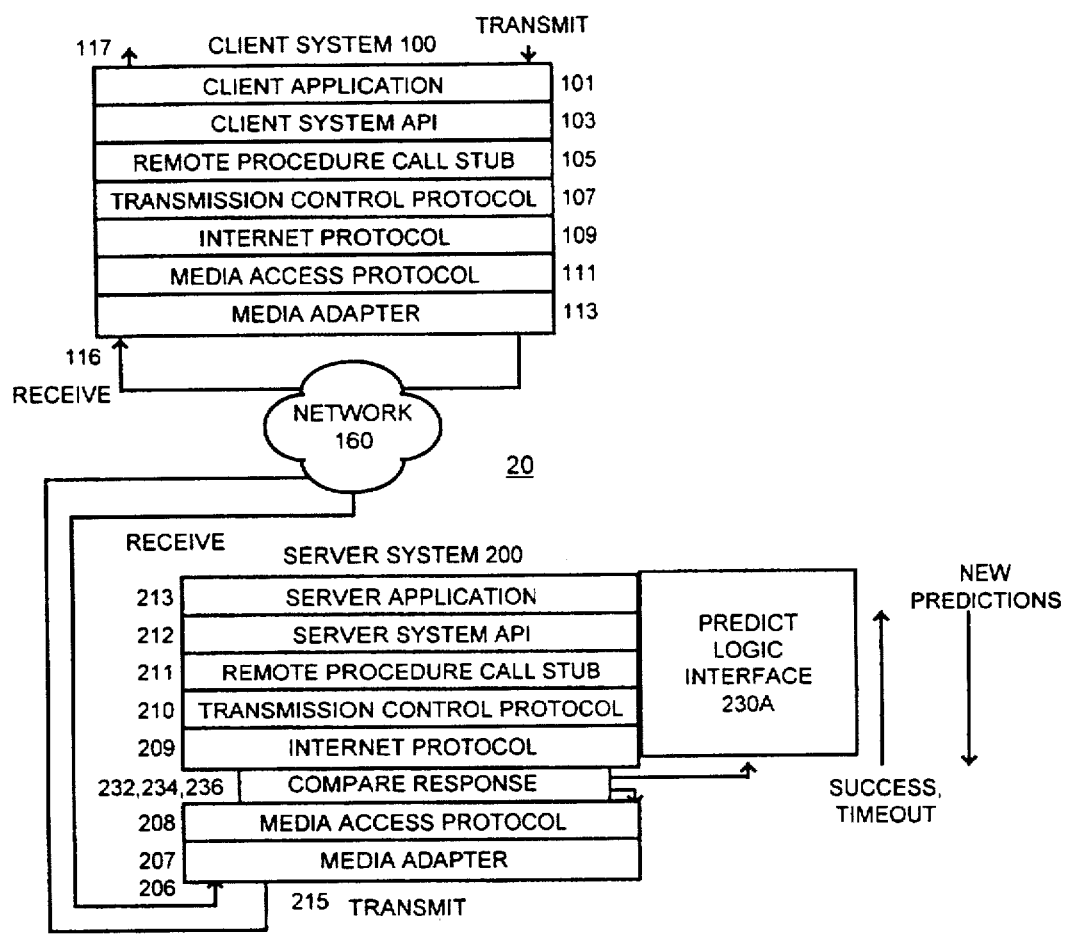
FIG. 2B is a block diagram representation of a protocol stack together with predict logic of the computer communications network system of FIG. 1 of the preferred embodiment.
Figure 3:
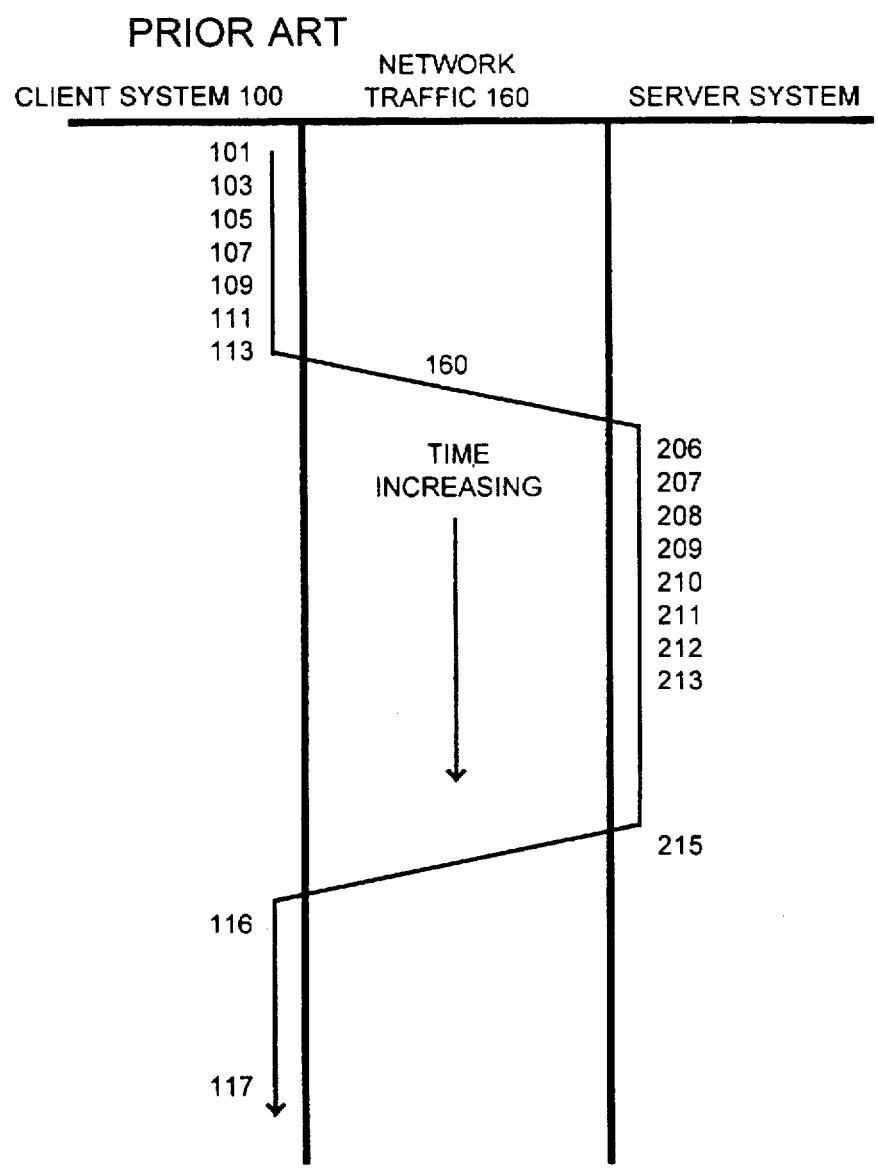
FIG. 3 shows the time relationship of prior art request and response packets between the client and server system of FIG. 2A.
Figure 8A:
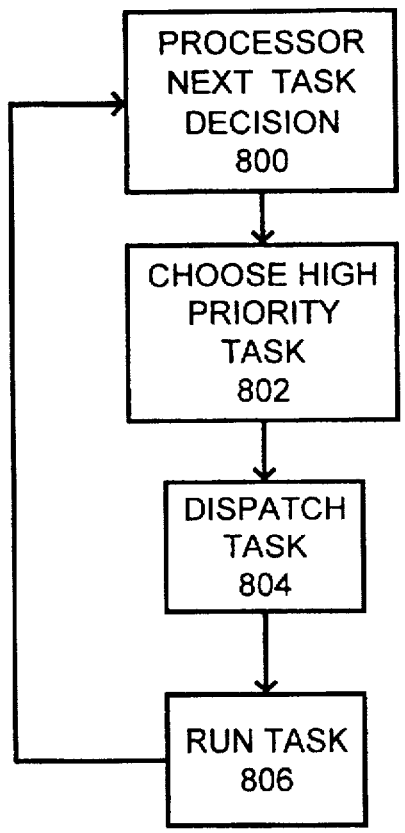
FIG. 8A is a flow chart illustrating logical steps performed by a server processor of the computer communications network system of FIG. 1 for task scheduling in accordance with the preferred embodiment.
Figure 8B:
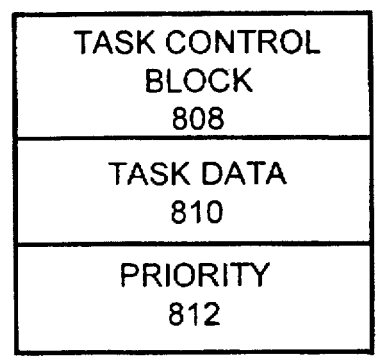
FIG. 8B is a block diagram illustrating a task control block used by a server processor of the computer communications network system of FIG. 1 in accordance with the preferred embodiment.
Figure 8C:
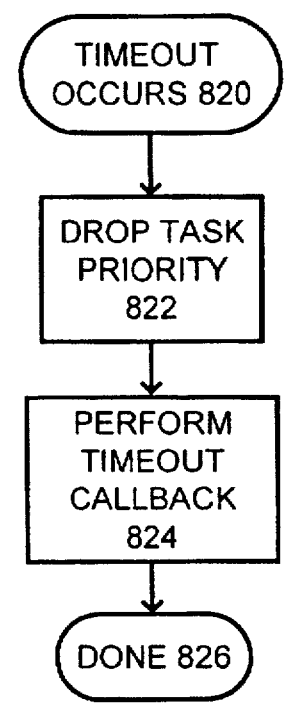
FIG. 8C is a flow chart illustrating logical steps performed by a server processor of the computer communications network system of FIG. 1 for an associated timeout action in accordance with the preferred embodiment.
Figure 8D:
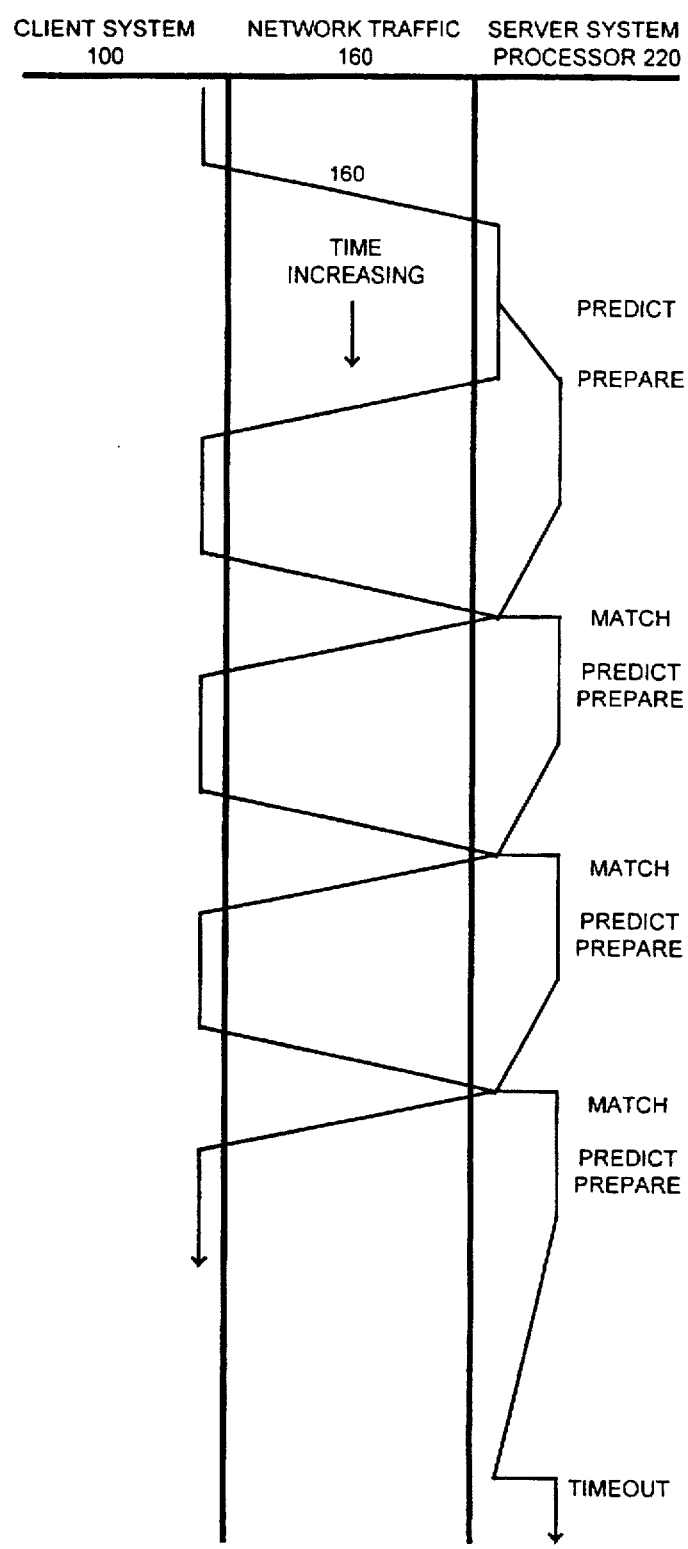
FIG. 8D shows the time relationship of sequential requests and response packets between the client and server system of the preferred embodiment.

Referring now to FIGS. 2A, 2B, 3, 4, 5, and 8D, features and advantages of the method, server system 200, and predict logic 230 of the invention may be understood with respect to prior art systems. In the drawings, the same reference numbers are used with respect to the illustrated prior art system for unchanged or identical components of the computer communications network system 20 of the preferred embodiment. FIG. 2A illustrates prior art protocol stacks of a conventional computer communications network system. Referring also to FIG. 2B, there are shown protocol stacks of the client system 100 and the server system 200 together with prediction logic interface 230A, and functions 232, 234, and 236 for the computer communications network system 20 in accordance with the preferred embodiment. FIG. 3 shows the time relationship of a request packet 400 of FIG. 4 and a response packet 500 of FIG. 5 between a client system 100 and server system of the prior art. In FIGS. 4 and 5, a network file system (NFS) request packet 400 and response packet 500 are shown. The network file system (NFS) protocol is described in RFC 1094 by Sun Microsystems, Inc., entitled "NFS: Network File System Protocol Specification", March, 1989. FIG. 8D shows the time relationship of sequential requests and response packets between the client system 100 and server system 200 of the preferred embodiment.

Referring initially to FIGS. 2A and 3, the client computer system 100 includes an operating system software protocol stack including a client application module 101, a client system application program interface (API) 103, a remote procedure call (RPC) stub 105, a transmission control protocol (TCP) module 107, an internet protocol (IP) module 109, a media access protocol 111 and the media adapter 113. The prior art server system includes an operating system software protocol stack including the media adapter 207, a media access protocol module 208, an internet protocol (IP) module 209, a transmission control protocol (TCP) module 210, a remote procedure call stub 211, a server system API 212, and a server application module 213.

In FIG. 3, the same reference characters as used in FIGS. 2A are used along the vertical time axis corresponding to sequential operations using modules 101, 103, 105, 107, 109, 111, and 113 of client system 100 and using modules 207, 208, 209, 210, 212, and 213 of the prior art server system. In FIGS. 2A and 3, a received packet 400 to the prior art server system is indicated by 206, and a transmitted response packet 500 from the prior art server system is indicated by 215. A received response packet 500 to the client system 100 is indicated by 116 and a processed response packet 500 is indicated by 117.

Client application 101, running on client system 100, initiates a server call or a request to the server system. Client application 101 uses client system API 103 to execute through the generated RPC stub 105. RPC stub 105 places arguments to the server procedure and places it in RPC header fields of request packet 400 as shown in FIG. 4. RPC stub 105 then calls the transmission control protocol (TCP) module 107. The transmission communication protocol can be any host-to-host protocol used with the internet protocol and the term TCP is used interchangeably with a user datagram protocol (UDP). The UDP transit module 107 builds a UDP transport header and check sum fields of a request packet 400. UDP 107 then calls the IP module 109, which builds IP network routing information fields of request packet 400. IP module 109 determines the network type and calls media access protocol (MAC) module 111. Media access protocol module 111 builds the MAC header fields of request packet 400 and a control block for the media adapter 113. Media access protocol module 111 then enqueues the request packet 400 on media adapter 113 for transmission across communications network 160.

For clarity of description, the protocol processing is described as being segmented into modules, with each module corresponding to a particular protocol module. One of ordinary skill in the art would recognize that the implementation of the protocol stack can be embodied with more modules, fewer modules, interleaved code or macro interfaces and fall within the scope of the invention. It should be understood that the present invention is not limited to the disclosed protocols, other protocols can be used, such as IBM's advanced peer-to-peer networking (APPN) or Novell's IPX.

Request packet 400 traverses communications network 160, arrives at server system 200, and is received by media adapter 207. Media adapter 207 interrupts a server system processor, alerting the server system processor to the arrival of the request packet 400. The interrupt service routine using media access protocol module 208 notifies the server scheduler to prepare to run the communication task which processes received request packets 400. When the communication task runs, it processes the MAC header, determines that request packet 400 is an internet protocol frame, and calls the IP module 209. The IP module 209 determines the packet is a UDP packet 400 and calls the UDP module 210. UDP module 210 uses the connection control block for this packet 400 and determines the application task 213 that should process the received packet and schedules the application task to run. When the application task 213 begins to run, the RPC stub 211 returns from the last network read call that it executed before going to sleep waiting for data, and reads the request data packet 400. RPC stub 211 decodes or unmarshals the argument, determines the desired server operation, performs the server operation, calls the server system API 212 to return the response to the request.

When the application task begins to run, RPC stub 211 reads request packet 400 and uses server system API 212 to pass request packet 400 to server application 213. Server application 213 performs the server operation that client system 100 requested and builds the data and NFS fields the in response packet 500, as shown in FIG. 5. The entire protocol stack is traversed in reverse, and response packet 500 is prepared and transmitted on network 160 and received by client system 100 and processed through its protocol stack and the response is returned to client application 101.

Referring now to FIG. 2B and 8D, server system 200 of the preferred embodiment includes an operating system software protocol stack including the media adapter 207, media access protocol 208, internet protocol (IP) module 209, transmission control protocol (TCP) module 210, remote procedure call stub 211, server system API 212, and server application module 213. Server system 200 further includes the compare function 232, compare data and trigger set function 234, and transmit data function 236 between the internet protocol module 209 and the media access protocol module 208, and a predict logic interface 230A, as shown in FIG. 2B. The predict logic interface 230A accesses the IP protocol module 209, TCP module 210, RPC stub 211, server system API 212, and the server application module 213, and generates one or more new predictions indicated at a line labeled NEW PREDICTIONS based on the present client's request. The compare data and trigger set function 234 sets a trigger that will recognize a match of the client's predicted request using the compare data function 232 coupled to the media access protocol module 208. When a client's predicted request arrives, the trigger sends the predicted response using the transmit data function 236. The compare data and trigger set function 234 and predict logic interface 230A generates a success action and a timeout action together with the predicted responses indicated at a line labeled SUCCESS, TIMEOUT. The timeout action is provided so that if a predicted request is not received within the timeout interval or other events occur before a predicted request arrives, the triggered response is removed and an alternative action is performed. The success action defines the action be taken when the predicted request arrives and can include a string of predicted responses.

As shown in FIG. 8D, when a first request is received by the server system 200, a next request is predicted and a response to the predicted request is prepared when the response to the first request is sent to the client system 100. When a match is identified by the server system 200 to the next request, then the predicted response is immediately sent to the client system 100 and a next request is predicted and a response to the predicted request is prepared. An illustrated timeout interval where a match is not identified by the server system 200 is provided for removing the predicted response and an alternate action is performed.

Figure 6A:
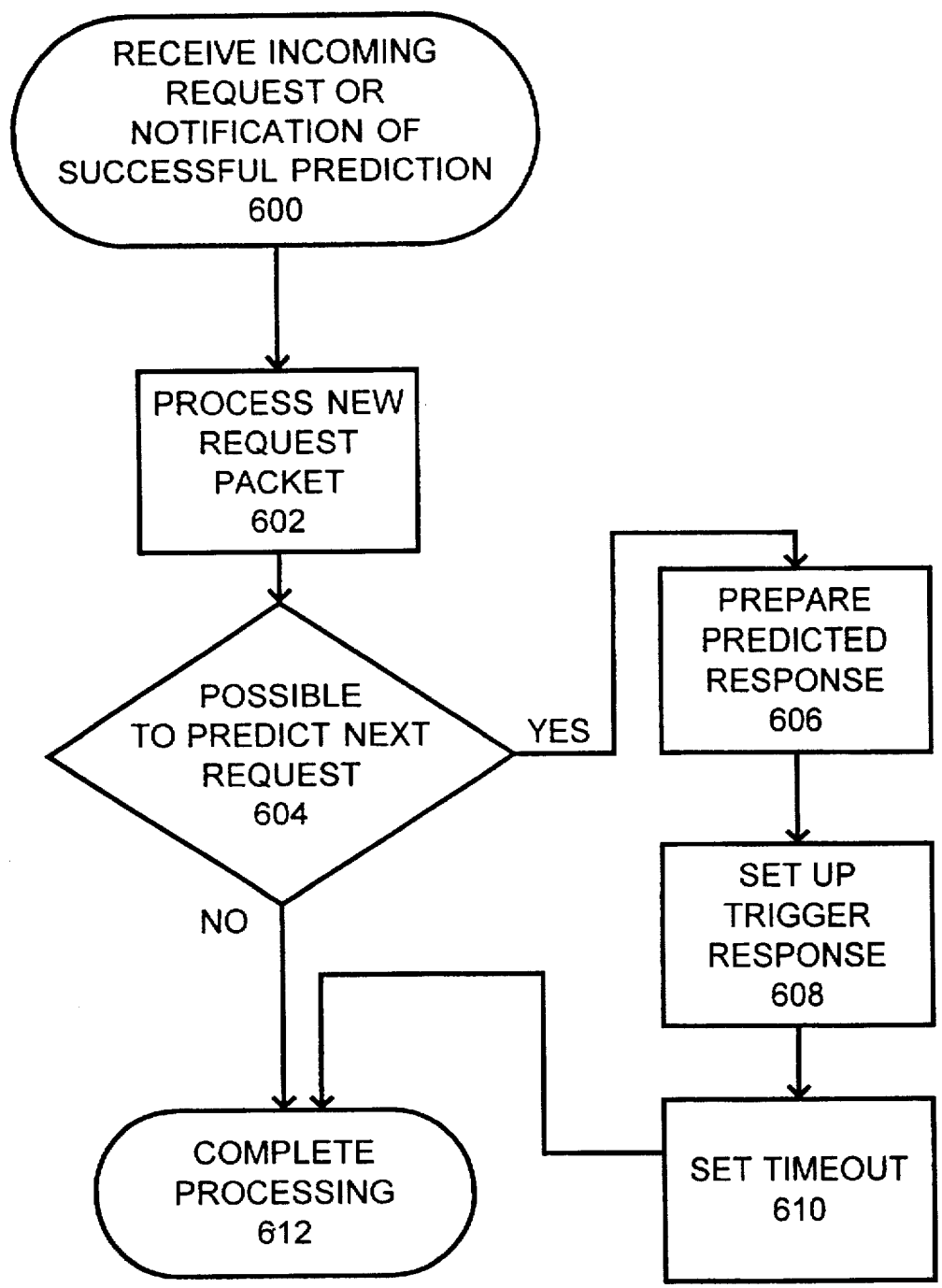
FIG. 6A is a flow chart illustrating logical steps performed by a server processor for predicted response generation of the computer communications network system of FIG. 1 in accordance with the preferred embodiment.
Figure 6B:
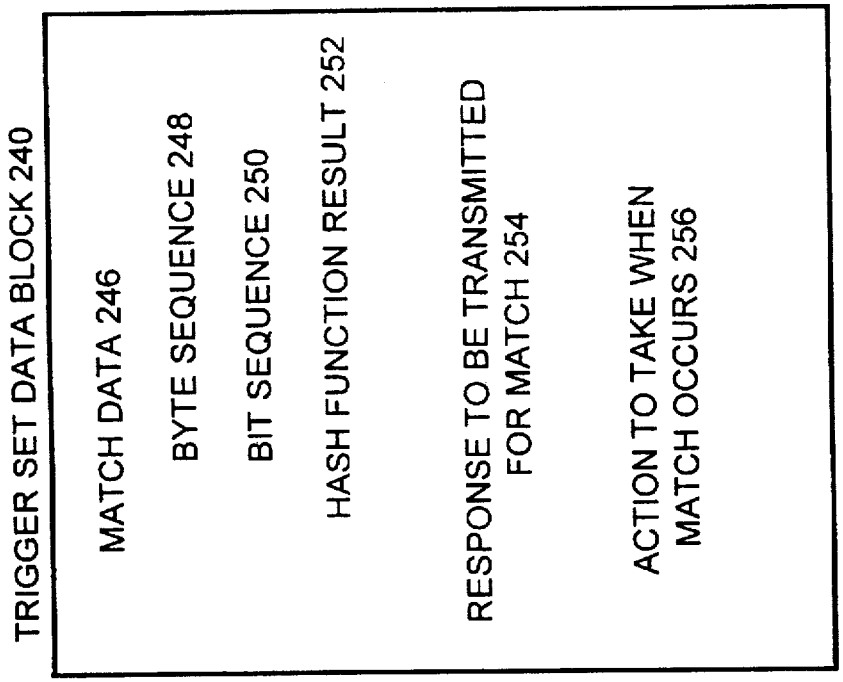
FIG. 6B is a block diagram illustrating a trigger set data block used by a server processor of the computer communications network system of FIG. 1 for preparing compare data and a trigger set in accordance with the preferred embodiment.

FIG. 6A illustrates logical steps for predicted response generation including the compare data and trigger set function 234 of FIGS. 1 and 2B performed by the server processor 220 of the preferred embodiment. An incoming request or notification of a successful prediction is received as indicated at a block 600. The new request packet is processed as indicated at a block 602. Next it is determined whether it is possible to predict a next request as indicated at a decision block 604. Operation at decision block 604 is specific to a particular protocol and is trained for multiple file system reads from the file system, server system API 212, and server application 213. When a next request can be predicted, then a predicted response is prepared as indicated at a block 606 as further illustrated and described with respect to FIGS. 6C and 6D. Also a group of predicted responses can be prepared at block 606. Then a trigger response as illustrated and described with respect to FIG. 6B is set up as indicated at a block 608. A timeout associated with the trigger or predicted response is set as indicated at a block 610. Processing of the current request is completed as indicated at a block 612. Otherwise, when a next request can not be predicted, for example, when the current request is to shut down the established connection, processing of the current request is completed at block 612.

FIG. 6B illustrates a trigger set data block 240 that is maintained for each triggered response that has been prepared. Trigger set data block 240 minimally contains match data 246 which is data to match with the received requests. The match data 246 contains three parts including a byte sequence 248 of the full request packet that is to trigger the match; a bit sequence 250, with 1 bit corresponding to each byte indicating whether this byte must be matched; and a hash function result 252 of the sections of the full request packet, using null inputs for those bytes that need not be matched. Trigger set data block 240 minimally contains a response 254 to be transmitted when a match occurs; and an action 256 to take when a match occurs.

It is not necessary for the bit sequence 256 and hash function result 252 to cover the entire input stream packet 400. Having reference to the request packet 400 in FIG. 4, four fields in the request 400 that are very difficult to predict and have minimal effect on the response 500 include the IP header field, Packet Identification=X, IP header field Checksum, the UDP header field, Checksum, and the RPC header field, Message ID=G. These fields are shown with an asterisk in FIG. 4 and not used to check the match in the preferred embodiment.

Figure 6C:
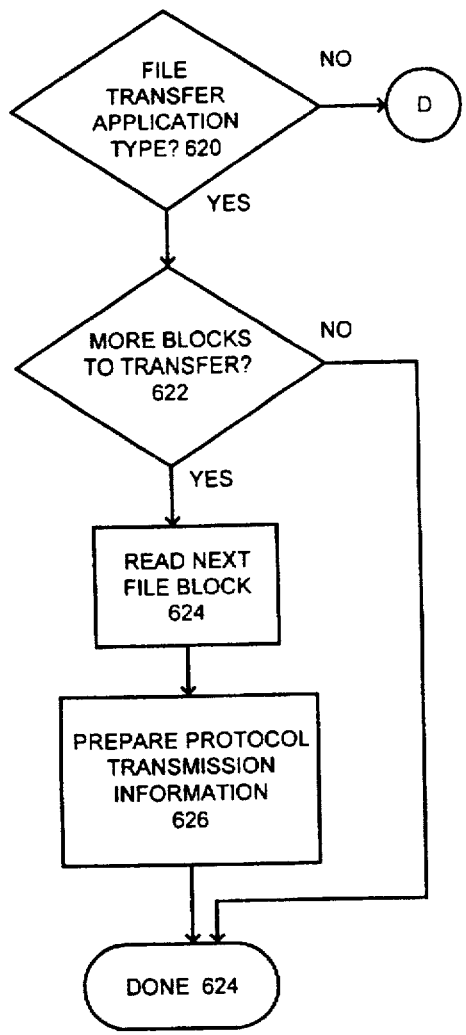
FIGS. 6C and 6D are more detailed flow charts illustrating exemplary steps performed by a server processor for preparing a predicted response.
Figure 6D:
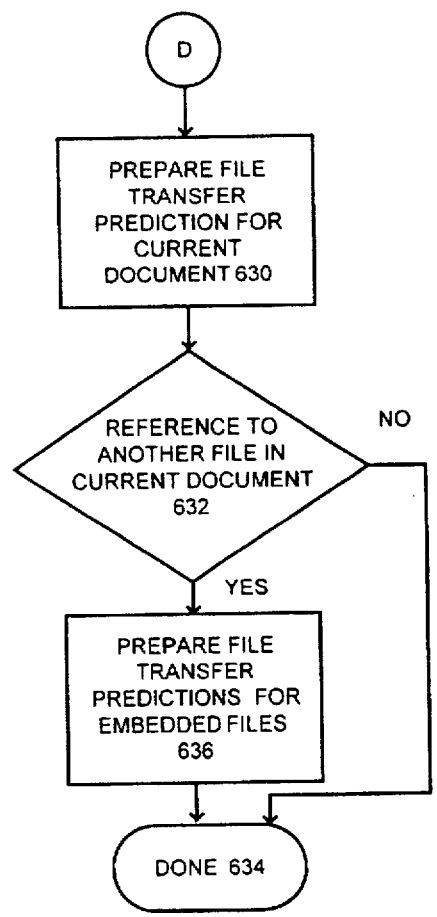

Referring now to FIGS. 6C and 6D, there are shown exemplary steps performed by the server processor 220 at block 606 for preparing a predicted response. In FIG. 6C, identification of the current application type, such as a file transfer is performed as indicated at a decision block 620. When a file transfer is identified at block 620, then preparation of the predicted response continues with checking for more blocks to transfer as indicated at a decision block 622. When more blocks are not identified at block 622, then the operations are completed as indicated at a block 624. Otherwise, when more blocks are identified at block 622, then the next file blocks are read as indicated at a block 626. Next protocol transmission information is prepared for the next file blocks as indicated at a block 628 to complete the predicted response. If a web server application is identified at block 620, then the sequential steps continue following entry point D in FIG. 6D.

Referring to FIG. 6D, sequential steps for preparing a predicted response, such as, for imbedded hypertext files begin with preparing a file transfer prediction for a current document as indicated at a block 630. Checking for references to other files in the current document is provided as indicated at a decision block 632. When a reference to another file is not identified at block 632, then the operations are completed as indicated at a block 634. Otherwise when one or more references to other files is identified at block 632, then file transfer predictions are prepared for the identified embedded files as indicated at a block 636 to complete the predicted responses.

Figure 7:
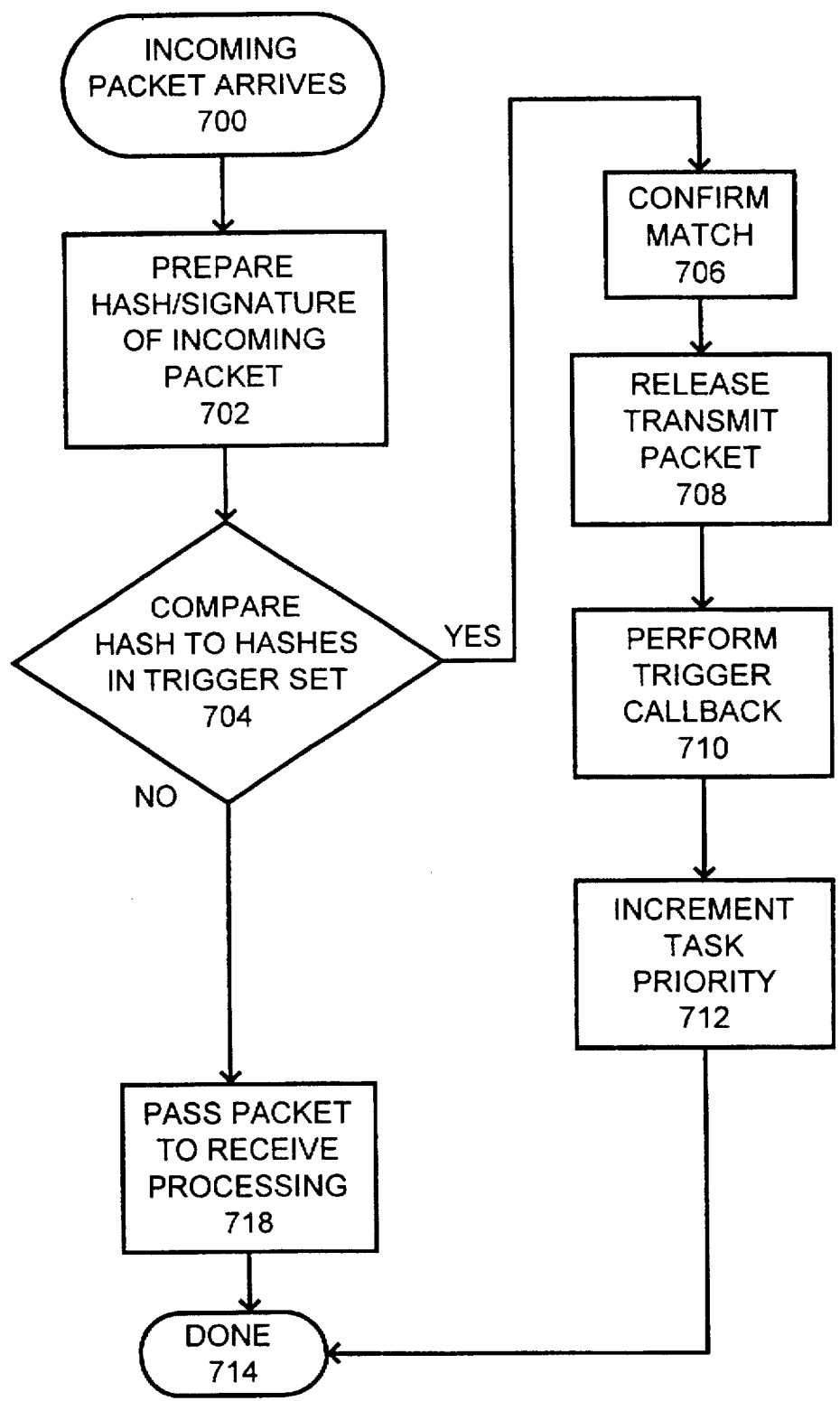
FIG. 7 is a flow chart illustrating logical steps performed by a server processor of the computer communications network system of FIG. 1 for processing requests in accordance with the preferred embodiment.

FIG. 7 illustrates logical steps performed by server processor 220 for processing incoming requests in accordance with the preferred embodiment. The sequential operations begin when an incoming request packet arrives as indicated at a block 700. A hash signature of the incoming packet is prepared as indicated at a block 702. The prepared hash signature is compared to a set of hash signatures or hashes in the trigger set as indicated at a block 704. When a match is confirmed as indicated at a block 706, then the predicted response packet is sent as indicated at a block 708. Then a trigger callback routine is performed to generate a new trigger set as indicated at a block 710. A task priority count is incremented as indicated at a block 712 to complete the routine as indicated at a block 714. The task priority count is maintained so that the tasks with a high priority count can be prioritized above other tasks with lower counts for task scheduling by the server processor 220. Otherwise, when a match of the hash signatures is not identified at decision block 704, then the incoming request packet is passed to receive processing as indicated at a block 718.

Referring to FIGS. 8A and 8B, logical steps performed by a server processor 220 for task scheduling are shown. FIG. 8B illustrates a task control block 808 including task data 810 and task priority 812 used by server processor 220. The task scheduling routine begins when server processor 220 identifies a next task decision as indicated at a block 800. Server processor 220 chooses the highest priority task as indicated at a block 802. Server processor 220 dispatches the selected task as indicated at a block 804. Server processor 220 runs the task as indicated at a block 806.

Referring to FIG. 8C, a timeout generated by timer logic 238 is identified as indicated at a block 820. Then the task priority is dropped as indicated at a block 822 and a timeout callback is performed as indicated at a block 824. As indicated at a block 826, this completes the operations by server processor 220 for a timeout action associated with a triggered response.

An exemplary algorithm follows that can be used in the preferred embodiment to process TCP and IP checksums and to ensure that the proper response packets are prepared. It should be understood that the method of the invention can be implemented in software as well on apparatus for performing this operation including three bit sequences, compare, IP checksum, TCP checksum; one result of checksum (identifies the connection); and a set of instructions for preparing the response by including the message identifier and updating the checksum.

An application programming interface (API) can be used to generalize the interface. In the preferred embodiment, the API is:

```
set_trigger (socket, trigger_data);
The trigger data provided is a structure of the form:
struct trigger_data {
    int        request_length;    /*Length of Incoming
                                   request in bytes */
    char       *request_form;     /*The data that will
                                   be in the incoming
                                   packet*/
    char       *match_sequence;   /*Boolean sequence -
                                   true if this byte is
                                   included in the match,
                                   false if not*/
    char       *checksum_check;   /*Byte sequence: 0
                                   if this byte not part of
                                   any checksum, 1 if this
                                   byte part of IP checksum,
                                   2 if this byte part of TCP
                                   checksum*/
    uint16     checksum_seed;     /*TCP uses a pseudo
                                   header for the checksum.
                                   If the TCP checksum is
                                   good, the collected
                                   checksum will match this
                                   seed.*/
    int        response_length;   /*the length of the
                                   response to be sent*/
    char       *response_data;    /*the data to be sent
                                   as the response/*
    struct     update_instr *ui;  /*a set of
                                   instructions to be run to
                                   update the packet to be
                                   transmitted*/
    function   *match_callback;   /*function to be
                                   called with the address of
                                   this structure when a
                                   match has been detected
                                   and the response
                                   transmitted; this function
                                   can be used to raise the
                                   priority of a task*/
    timeval    timeout            /*how long this entry
                                   is good for*/
    function   *timeout_callback; /*function to be
                                   called if timeout expires;
                                   this function can be used
                                   to lower the priority of a
                                   task*/
}
```

Figure 9:
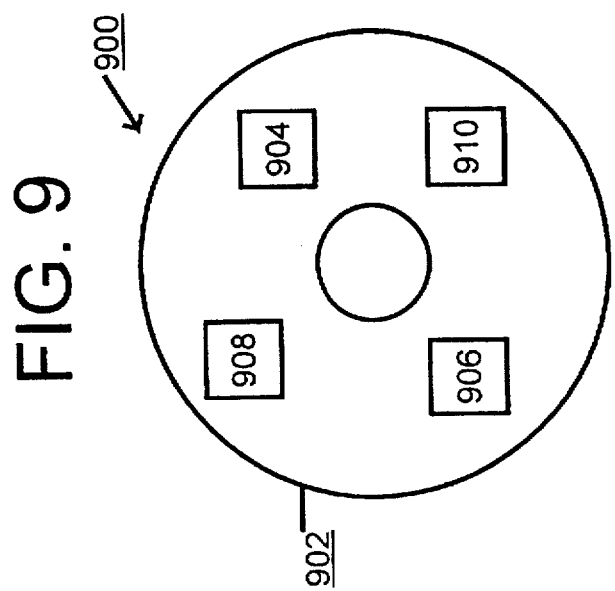
FIG. 9 is a block diagram illustrating a computer program product in accordance with the preferred embodiment.

Referring now to FIG. 9, an article of manufacture or a computer program product 900 of the invention is illustrated. The computer program product 900 includes a recording medium 902, such as, a floppy disk, a high capacity read only memory in the form of an optically read compact disk or CD-ROM, a tape, a transmission type media such as a digital or analog communications link, or a similar computer program product. Recording medium 802 stores program means 904, 906, 908, 910 on the medium 902 for carrying out the methods of this invention in the server system 200 of FIG. 1.

A sequence of program instructions or a logical assembly of one or more interrelated modules defined by the recorded program means 904, 906, 908, 910, direct the server computer system 200 to perform the generation of predicted responses of the invention.

While the present invention has been described with reference to the details of the embodiments of the invention shown in the drawing, these details are not intended to limit the scope of the invention as claimed in the appended claims.

What is claimed is:

1. A server computer system including a processor, a file system and a network adapter, wherein said server computer system is connected via a communications network to a client computer system, said server computer system comprising:

receiver means coupled to said communications network for receiving an incoming request from said client system, handler means coupled to said receiver means for processing a first incoming request and preparing a first response, wherein said handler means further comprises executable instructions executing on said processor, predictor means coupled to said handler means for predicting a second request from said client system and for preparing a predicted second response to said predicted second request, comparator coupled to said receiver means and said predictor means for comparing incoming requests from said communications network to said predicted second request, and transmitter means coupled to said handler means and said comparator means for transmitting said first response to said client computer system via said communications network and for transmitting said predicted second response, when said comparator means identifies a match of said incoming request to said predicted second request, to said client computer system via said communications network.

2. The server computer system of claim 1, wherein said comparator means further comprises means for generating and comparing a hash signature of said incoming requests to a trigger set containing said predicted second request.

3. The server comparator system of claim 2, wherein said comparator means further comprises means for generating said hash signature of a predefined portion of said incoming request.

4. The server computer system of claim 3, wherein predefined packet identification and header checksum fields of a request packet are not covered by said predefined portion of said incoming request.

5. The server computer system of claim 2, wherein said trigger set contains a success action; said success action to be taken when said match is identified.

6. The server computer system of claim 5, wherein said success action includes a set of predicted requests and predicted responses.

7. The server computer system of claim 5, wherein said success action includes a prediction count value used for task scheduling.

8. The server computer system of claim 7, includes means incrementing said prediction count value responsive to transmitting said predicted second response.

9. The server computer system of claim 2, wherein said trigger set contains a timeout success action; said timeout success action to remove said predicted second response and said trigger set.

10. A method for generating predicted responses in a server computer system including a processor, a file system and a network adapter, wherein said server computer system is connected via a communications network to a client computer system, said method comprising the steps of:

receiving an incoming request from said client system, processing a first incoming request and preparing a first response, transmitting said first response to said client computer system via said communications network;

predicting a second request from said client system and preparing a predicted second response to said predicted second request, comparing a next incoming request from said communications network to said predicted second request, wherein said comparing step further comprises generating and comparing a hash signature of said incoming request to a trigger set containing said predicted second request, and responsive to an identified match of said next incoming request to said predicted second request, transmitting said predicted second response to said client computer system via said communications network.

11. A method for generating predicted responses in a server computer system as recited in claim 10 wherein said step of generating said hash signature includes the step of generating said hash signature of a predefined portion of said incoming request; wherein predefined packet identification and header checksum fields of a request packet are not covered by said predefined portion of said incoming request.

12. A method for generating predicted responses in a server computer system as recited in claim 10 wherein said step of preparing said predicted second response to said predicted second request further includes the step of generating a trigger set including match data, said predicted second response, and a success action to be taken when a match is identified.

13. A method for generating predicted responses in a server computer system as recited in claim 12 wherein said step of generating said trigger set including said success action includes the step of generating a prediction count value used for task scheduling.

14. A method for generating predicted responses in a server computer system as recited in claim 12 wherein said step of generating said trigger set including said success action includes the step of generating a timeout success action used to remove said predicted second response and said trigger set.

15. A method for generating predicted responses in a server computer system as recited in claim 10 wherein said step of preparing said predicted second response to said predicted second request includes the steps of identifying a reference to other file in a current document and generating a file transfer prediction for said identified referenced other file.

16. A method for generating predicted responses in a server computer system as recited in claim 10 wherein said step of preparing said predicted second response to said predicted second request includes the steps of identifying additional file blocks for a file transfer; reading next file blocks and preparing protocol transmission information for said next file blocks.

* * * * *